March 19, 1929.  G. G. RAYMOND  1,706,253
HAND TRUCK
Filed Jan. 12, 1928
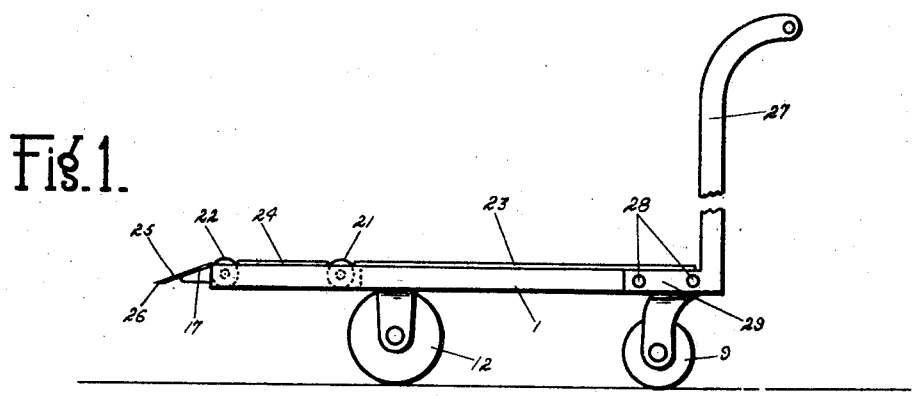
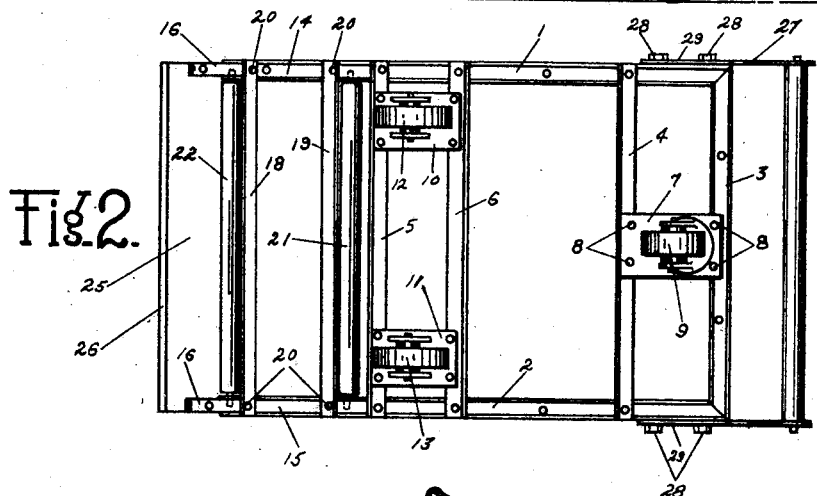
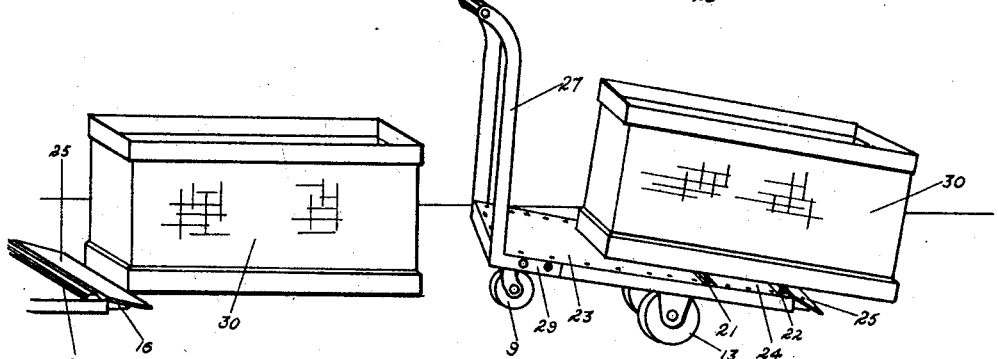
INVENTOR.
GEORGE G. RAYMOND
BY
ATTORNEY Patented Mar. 19, 1929.

1,706,253

UNITED STATES PATENT OFFICE.

GEORGE G. RAYMOND, OF GREENE, NEW YORK.

HAND TRUCK.

Application filed January 12, 1928. Serial No. 246,300.

My invention relates to hand trucks designed particularly for use in warehouses, mercantile establishments, and other lines of business wherein there are boxes, baskets, packages, etc. to be transported from one place to another.

My improved truck is particularly adaptable for the transportation of commercial boxes and baskets of the type generally used in warehouses and factories where heavy articles are to be moved from one part of the building to another and are subject to frequent loading and unloading.

The principal object of my invention is to provide a small portable hand truck which is so constructed as to greatly facilitate the loading and unloading, as well as the supporting of heavy baskets, boxes, and the like.

One important object lies in the provision of a truck provided with a rigidly reinforced frame work, yet which is relatively light and easily handled for the loading and transporting of heavy articles.

Another object lies in the provision of a truck having its rollers or wheels so positioned with respect to the supporting platform that the truck may be tilted so as to place one end in close proximity to the floor or ground whereby the basket or box may be slid into position on the truck with very little assistance from the operator, thereby eliminating the necessity of lifting the same.

Another object lies in the provision of anti-friction rollers so placed as to facilitate the loading and unloading of the boxes to and from the truck.

Still another object lies in the provision of a sloping nose or guide member at the front end of the truck to facilitate the insertion of the truck under a box or basket positioned flat on the floor or other supporting surface.

Other objects and advantages in details of construction and operation will be apparent as the description proceeds, reference now being had to the figures of the drawing wherein like reference numerals indicate like parts.

In the drawing:—

Figure 1 is a side elevation of my improved truck.

Figure 2 is a bottom plan view thereof.

Figure 3 is a detail perspective view illustrating the method of inserting the truck under a basket for loading the same.

Figure 4 is a detail perspective view illustrating the basket partially positioned upon the truck.

A frame member is provided comprising two parallel side arms 1 and 2, connected at one end by the transverse member 3. These frame members are preferably of channel iron or steel in order to provide great strength and rigidity to the frame, and if desired, the pieces 1, 2 and 3 may be integral with each other and formed from a single length of material bent to the form shown in Figure 2.

Extending between the side arms 1 and 2 of the frame and spaced inwardly a short distance from the member 3, is a reinforcing member or strap 4 parallel with the member 3. This reinforcing strap preferably lies in the same plane as the member 3 and may be secured at its ends to the side bars 1 and 2 in any desired manner.

Adjacent the opposite end of the frame but spaced inwardly therefrom a suitable distance, are two spaced parallel reinforcing members 5 and 6 secured at their opposite ends to the side bars 1 and 2 and lying in the same plane with the reinforcing member 4. The members 4, 5 and 6, preferably of angle iron, in addition to reinforcing the frame work of the truck provide convenient means for supporting the casters or wheels by which the truck is rendered mobile. To this end, a supporting plate 7 is bolted or riveted or otherwise secured as at 8 at one end to the frame member 3 and at the opposite end to the reinforcing strap 4, and preferably positioned centrally of these two members. A caster 9 of conventional swivel type is carried by this plate 7 whereby the movements of the truck may be guided.

Adjacent the ends of the reinforcing straps 5 and 6 but lying within the sides 1 and 2 of the frame, are plates 10 and 11, similar to the plate 7. Wheels 12 and 13 preferably of the non-swivel type are mounted respectively upon the plates 10 and 11.

Suitably secured within each of the channel frame members 1 and 2, and projecting slightly beyond the ends thereof, are supporting straps 15, the projecting ends 16 of which have their upper edges bevelled downwardly as at 17. Additional reinforcing straps 18 and 19 are provided adjacent this front end of the truck and extending parallel between the frame members 1 and 2. These straps, besides providing great strength and rigidity for the front end of the truck and the fastening means 20 therefor, also serve as additional fastening means for the extension supports 14 and 15, thereby reinforcing these members.

Parallel anti-friction rollers 21 and 22 are suitably journaled in the side frame members 1 and 2, adjacent the front end of the truck. The roller 21 is positioned just ahead of the reinforcing member 5 and between that member and the reinforcing strap 19. The roller 22 is positioned at the extreme end of the frame members 1 and 2 just beyond the reinforcing strap 18. The rollers are so positioned that their peripheries extend slightly above the horizontal plane of the frame members 1 and 2.

A floor is provided for the truck comprising preferably a sheet of metal 23 extending from the rear end of the truck to a point adjacent the roller 21, and a second sheet of metal 24 lying between the rollers 21 and 22. These sheets of flooring are preferably of metal, though it will be understood that other materials may be used. Any suitable securing means may be provided for fastening these floor members to the frame members of the truck. It will be observed with reference to Figure 1 that the upper surface of the floor lies very slightly below the outwardly projecting peripheries of the anti-friction rollers 21 and 22, whereby the movement of a basket or box onto or off of the floor is facilitated by such rollers.

Suitably secured to the projecting ends 16 of the extension members 14 and 15, and extending across between such members directly ahead of the roller 22, is a nose or guide member 25 positioned at a downward angle to the floor of the truck, due to the bevelled ends 17 of such extension members. This nose 25 is also preferably of steel and the free edge thereof is bevelled off on its underside as at 26 to provide a relatively thin sharp edge on such nose, whereby to facilitate the insertion thereof beneath a basket or box positioned flat on the floor or supporting surface.

A suitable handle 27 is provided adjacent the end frame member 3 and is secured in position by means of bolts or rivets 28 passing through the angle portion 29 of the handle lying adjacent the ends of the side bars 1 and 2.

It will be obvious that the inward spacing of the wheels 12 and 13 permits the tilting of the truck so as to bring the nose 25 to the floor in position to be inserted beneath a basket or box 30 such as is shown in Figure 3. Obviously further movement of the truck under the basket 30, facilitated by the anti-friction rollers 21 and 22, serves to raise the basket upon the floor of the truck to position within easy grasp of the operator who can then complete the pulling of the basket upon the truck by hand.

The reinforcement of the frame work particularly at the front 1, and the nose 25, not only makes possible the lifting and transporting of extremely heavy articles, but facilitates the loading and unloading thereof. It will be understood of course that the proper positioning of the casters or wheels of the truck provides a balance, permitting a maximum ease of handling the same.

Of course, changes may be made in details of construction and operation, without departing from the spirit and scope of my invention. I do not limit myself therefore to the exact form herein shown and described, other than by the appended claims.

I claim:—

1. A truck comprising a frame consisting of vertical and inwardly turned horizontal flanges, reinforcing straps extending at spaced intervals across said frame, a floor on said frame, a caster and wheels supported by said straps, extension members secured to said flanges and projecting beyond the front end of said frame, and a downwardly turned nose supported at its ends by said extension members.

2. A truck comprising a frame consisting of vertical and inwardly turned horizontal flanges, reinforcing straps extending at spaced intervals across said frame, a floor on said frame, a caster and wheels supported by said straps, extension members secured to said flanges and projecting beyond the front end of said frame, and a downwardly turned nose supported at its ends by said extension members, said wheels being spaced inwardly from the front end of said frame to permit tilting said end downwardly to bring said nose to floor engaging position.

3. A truck comprising a frame consisting of vertical and horizontal flanges, reinforcing straps extending across said frame and supporting a caster and wheels, extension members secured to said flanges and projecting beyond the front end of said frame, the upper edges of the free ends of said members being bevelled downwardly, and a flat strip supported at its ends on said bevelled edges, forming a downwardly turned nose for said truck.

4. A truck comprising a frame consisting of vertical and horizontal flanges, reinforcing straps extending across said frame and supporting a caster and wheels, extension members secured to said flanges and projecting beyond the front end of said frame, the upper edges of the free ends of said members being bevelled downwardly, and a flat strip supported at its ends on said bevelled edges, forming a downwardly turned nose for said truck, the under side of the free edge of said nose being bevelled to provide a thin edge for insertion under an article to be lifted.

5. A truck comprising a frame consisting of vertical and horizontal flanges reinforcing straps extending across said frame and supporting a caster and wheels, extension members secured to said flanges and projecting beyond the front end of said frame, the upper edges of the free ends of said members being bevelled downwardly, and a flat strip supported at its ends on said bevelled edges, forming a downwardly turned nose for said truck, and an anti-friction roller journalled in said frame directly to the rear of said nose.

6. A truck comprising a frame consisting of vertical and horizontal flanges, reinforcing straps extending across said frame and supporting a caster and wheels, extension members secured to said flanges and projecting beyond the front end of said frame, the upper edges of the free ends of said members being bevelled downwardly, and a flat strip supported at its ends on said bevelled edges, forming a downwardly turned nose for said truck, an anti-friction roller journalled in said frame directly to the rear of said nose, and a floor on said frame, the upper surface thereof lying slightly below the upper periphery of said roller.

GEORGE G. RAYMOND.